United States Patent [19]
Harris et al.

[11] Patent Number: 5,972,279
[45] Date of Patent: Oct. 26, 1999

[54] METHOD OF TRANSFERRING A PRE-MOLDED FILM INTO A MOLD

[75] Inventors: Mark Alan Harris, Dexter; Zinoviy Chernyak, Farmington Hills, both of Mich.

[73] Assignee: Ford Motor Company, Dearborn, Mich.

[21] Appl. No.: 08/903,465

[22] Filed: Jul. 30, 1997

[51] Int. Cl.$^6$ ................................................. B29C 31/08
[52] U.S. Cl. ........................ 264/513; 264/269; 264/275; 264/318; 425/126.1; 425/127; 425/DIG. 58; 414/800
[58] Field of Search ..................... 264/513, 511, 264/516, 267, 275, 318, 509, 269; 475/176.1, 397, DIG. 14, DIG. 58; 414/806, 808, 800; 425/127

[56] References Cited

U.S. PATENT DOCUMENTS

| | | |
|---|---|---|
| 3,619,858 | 11/1971 | Sutch . |
| 3,668,034 | 6/1972 | Nicholas et al. . |
| 4,650,533 | 3/1987 | Parker et al. . |
| 4,769,100 | 9/1988 | Short et al. . |
| 4,902,557 | 2/1990 | Rohrbacher . |
| 4,913,760 | 4/1990 | Benson et al. . |
| 4,976,896 | 12/1990 | Short et al. . |
| 5,034,077 | 7/1991 | Pata . |
| 5,034,269 | 7/1991 | Wheeler . |
| 5,037,680 | 8/1991 | Papendick et al. . |
| 5,055,346 | 10/1991 | Rohrbacher . |
| 5,114,789 | 5/1992 | Reafler . |
| 5,125,994 | 6/1992 | Harasta et al. . |
| 5,192,609 | 3/1993 | Carroll, Jr. . |
| 5,208,081 | 5/1993 | Gübitz et al. . |
| 5,215,811 | 6/1993 | Reafler et al. . |
| 5,215,826 | 6/1993 | Shimanski et la. . |
| 5,248,364 | 9/1993 | Liu et al. . |
| 5,271,352 | 12/1993 | Wilson . |
| 5,342,666 | 8/1994 | Ellison et al. . |
| 5,350,473 | 9/1994 | Weder et al. . |
| 5,435,865 | 7/1995 | Lee et al. . |
| 5,514,427 | 5/1996 | Ellison et al. . |
| 5,536,539 | 7/1996 | Ellison et al. . |
| 5,538,576 | 7/1996 | Knop et al. . |
| 5,585,187 | 12/1996 | Shinonaga et al. . |
| 5,599,608 | 2/1997 | Yamamoto et al. . |

FOREIGN PATENT DOCUMENTS 0 764 513   3/1997   United Kingdom .

*Primary Examiner*—Jan H. Silbaugh
*Assistant Examiner*—Edmund H. Lee
*Attorney, Agent, or Firm*—Damian Porcari

[57] ABSTRACT

A method and apparatus for transferring a pre-molded film into a cavity by the following steps. A robotically controlled arm having a loader receives flexible film. The loader by two moveable end portion and a main portion there between. The pre-molded film is transferred onto the loader. The end portions are retracted so that the loader is in a retracted position. The loader is moved to a position within a cavity. The cavity has an opening that is larger then the loader when the loader is in the retracted position. The film is transferred to the cavity by aligning the film with corresponding three-dimensional contours on the cavity. The edge portions are extended so that essentially the entire surface of the film contacts the cavity. The loader is withdrawn from the cavity by first retracting the end portions and removing the loader.

4 Claims, 3 Drawing Sheets

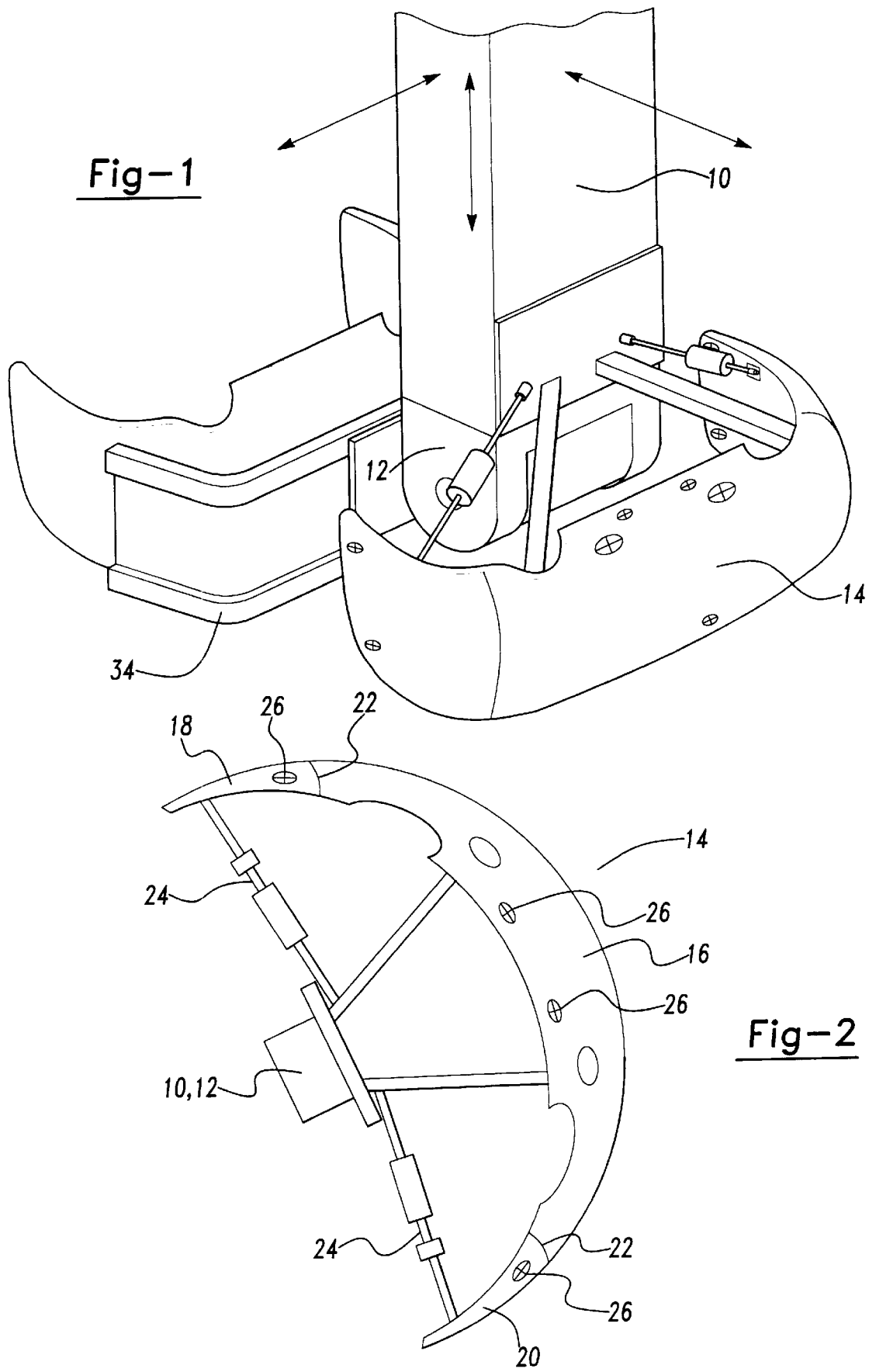

METHOD OF TRANSFERRING A PRE-MOLDED FILM INTO A MOLD

BACKGROUND OF INVENTION

1. Field of the Invention

Present invention is directed to a method and apparatus for transferring a pre-molded film into a mold. More specifically, the present invention is directed to providing a robotically controlled moveable arm to transfer a flexible, pre-molded film into an injection-molding tool.

2. Description of the Related Arts

It is known to manufacture injection molded articles in an injection molding press. Generally, the robotically controlled arm manipulates a device called an unloader to remove articles manufactured in the press. The unloader secures the molded article by vacuum and lifts the molded article from the core portion of the mold.

It is also known to manufacture molded articles using flexible films wherein the film is placed within a mold cavity and a polymer is injected behind the film to heat and soften the film backing. The film backing fuses to the polymer to form a molded article. An example of this type of method is taught in U.S. Pat. No. 3,668,034. One difficulty in manufacturing molded articles using pre-molded flexible films, is properly positioning the flexible film within the molds so that it is free of wrinkles or creases and is precisely positioned in the cavity to register with the cavity contours to form the desired article. Heretofore, proper placement of the pre-molded film within the cavity has been a major stumbling block to widespread application of pre-molded films. The problem is especially acute when handling thin pre-molded films for large automotive applications such as bumper facias, instrument panels and door panels. The entire surface area of the film must be properly positioned within the cavity to produce a defect-free article. Slight misalignments will cause wrinkles or defects and make the article unusable.

It is necessary to precisely place the film between the operable core and cavity pieces of a molding press. Because these operable pieces open and close, it is advantageous to provide a mechanism which allows the pre-molded film to be robotically placed within the mold rather then manual placement by an operator. It is a further desired result of the present invention to utilize the existing equipment for removing the molded article from the core, in the method for placing the pre-molded film within the mold. It is also desired that the method and apparatus utilize existing molding equipment to the maximum extent possible. This includes utilizing a mold press and core with a limited opening there between. It is further desirable to manufacture an article in a tool that is subject to "die-lock" conditions. Die-lock conditions occur when the molded article has a dimension greater than the opening of the mold. Die-lock prevents the article from being removed from the cavity after the molding operation. Utilizing die-lock conditions enables the manufacture of parts with covered edge portions or flanges.

A variety of methods are known for removing articles from molds that are subject to die-lock, however, a method of placing flexible films within a cavity that is subject to die-lock has not been shown. It is yet another desired object of the present invention to provide a method and apparatus for placing a pre-molded film into a cavity that is subject to die-lock conditions. It is further desirable to precisely position a pre-molded film within a cavity so that edge portions are placed within the cavity and a flange portion is formed behind the edge portion.

It is known to form a covered edge using in-mold films. An example of this construction is illustrated in U.S. Pat. No. 5,599,608. A film having a re-entrant edge portion is placed within a mold. A cavity is moved to contact the core. The core engages the re-entrant portions and folds them within the cavity. Molten plastic is injected into the cavity and the combination of closing the mold combined with the pressure the molten plastic material forces the re-entrant edge portions against the cavity wall to form the covered edge of the molded article. The method described in U.S. Pat. No. 5,599,608 is limited to forming an edge portion having a width equal to the thickness of the substrate. This is useful when forming a part having a covered edge, but not useful when forming a part having a covered flange portion. A flange creates a space behind the flange known as an undercut. The U.S. Pat. No. 5,599,609 patent does not teach forming parts having an undercut.

These deficiencies and problems are overcome by the present invention.

SUMMARY OF THE INVENTION

The present invention is directed to a method an apparatus for transferring a pre-molded film into a mold comprising the following steps. A robotically controlled arm having a loader receives flexible film. The loader comprises two moveable end portions and a main portion there between. The pre-molded film is transferred onto the loader. The end portions are retracted so that the loader is in a retracted position. The loader is moved to a position within a mold. The mold has an opening that is larger then the loader when the loader is in the retracted position. The film is transferred to the cavity by aligning the film with corresponding three-dimensional contours on the mold. The edge portions are extended so that essentially the entire surface of the film contacts the mold. The loader is withdrawn from the cavity by first retracting the end portions and removing the loader.

The invention also provides an apparatus for practicing the foregoing method. The apparatus for transferring a pre-molded film into a mold comprises a robotically controlled arm having a moveable end. A loader is attached to the end. The loader has two moveable end portions and a main portion there between. Vacuum ports located on the end portions and on the main portion act to retain the film on the loader while the film is transferred to the mold. Extenders positioned between the end portions and the robot arm end act to extend and retract the end portions. The apparatus enables a loader having a width greater then the opening of the cavity to be inserted within the cavity. The die-lock condition is overcome by retracting the end portions prior to inserting the film. The film is transferred to the cavity by moving the extenders to the extended position and contacting the film with the interior surface of the cavity. The loader is removed from cavity by retracting the extenders to reduce the width of the loader.

The invention enables the manufacture of film covered molded articles having a covered flange portion. The invention further enables the handling of flexible films and easily inserting the films within a cavity without scuffing or scratching the films. It is another advantage of the present invention to provide a robotically controlled arm and loader that positions the film within a cavity that is not normally accessible by an operator. It is another advantage of the present invention to repeatedly locate a flexible film within a cavity by aligning three-dimensional contours of the film onto a cavity surface.

These and other desired objects of the present invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 1 is a perspective view of a robotically controlled loader.

FIG. 2 is a detailed perspective view of the loader.

DETAILED DESCRIPTION OF THE PREFERRED EMBODIMENTS

Figure 3:
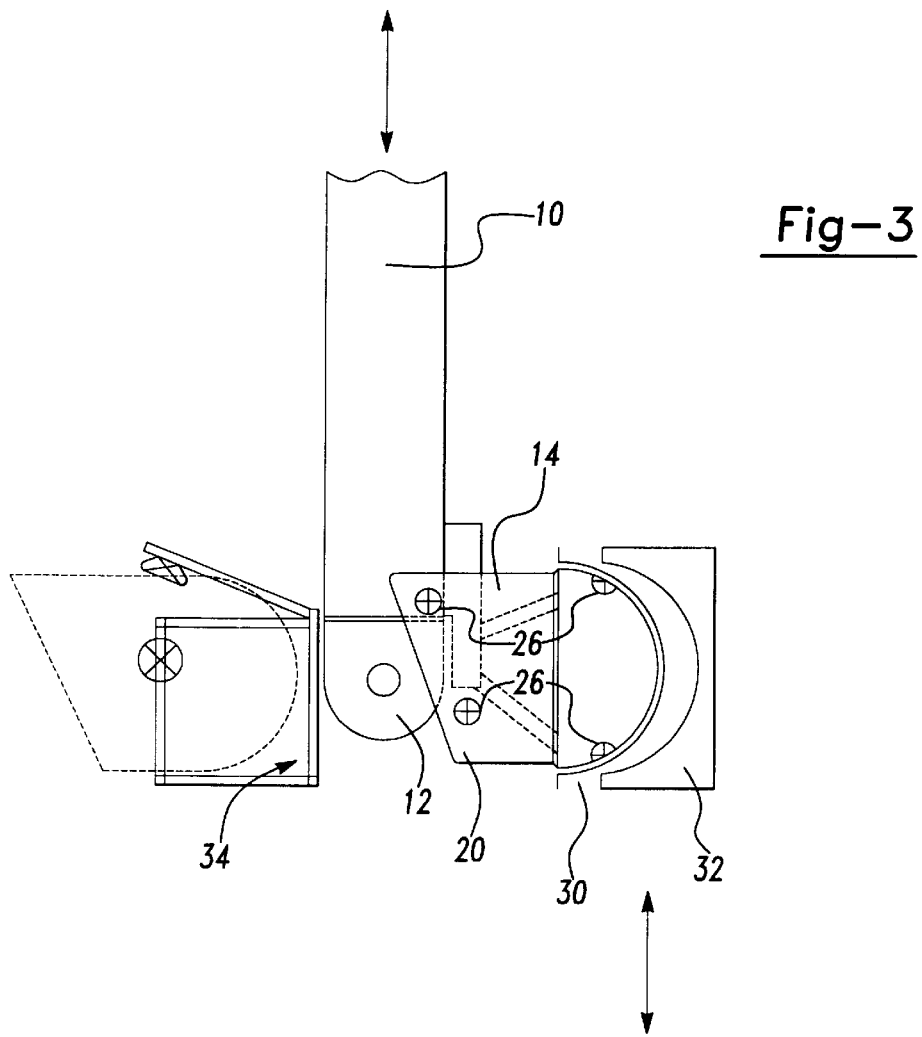
FIG. 3 is a perspective view of the loader attached to a robot arm.

Illustrated in FIG. 1 is a robotically controlled arm 10. The arm 10 is moveable in both vertical and horizontal axis. The robot arm 10 includes a moveable end 12. Attached to the moveable end 12 is a loader 14. The loader 14 is rigidly fastened to the end 12. The loader 14 moves in conjunction with the end 12. The loader 14 receives a pre-molded flexible film useful in manufacturing film-coated articles. The loader 14 receives the film from a film loading station (not shown) and transfers it into a mold. The film has a thickness of 0.19–35 mils and is not self-supporting.

Illustrated in FIG. 2 is a detailed view of the loader 14. The loader 14 comprises a main portion 16 that is attached in a fixed position to the end 12. Attached to either end of main portion 16 are end portion 18, 20. The end portions 18, 20 are attached to main portions 16 by hinges 22. The end portions 18, 20 pivot or swing along hinges 22. The end portions 18, 20 are attached to the end 12 by extenders 24. The extenders 24 are pneumatically or hydraulically operated pistons that elongate or contract and act to pivot end portions 18, 20. Other suitable mechanisms to control the movement of the end portions 18, 20 include pneumatically operated cylinders, linear motors, solenoids, rack & pinion gearing or worm gearing. Located along the surface of the main portion 16 and the end portions 18,20 are a plurality of vacuum ports 26. The vacuum ports 26 are connected to vacuum lines 28 and to a pump (not shown) that draws a vacuum. The vacuum serves to retain the flexible film on the loader 14.

Figure 4:
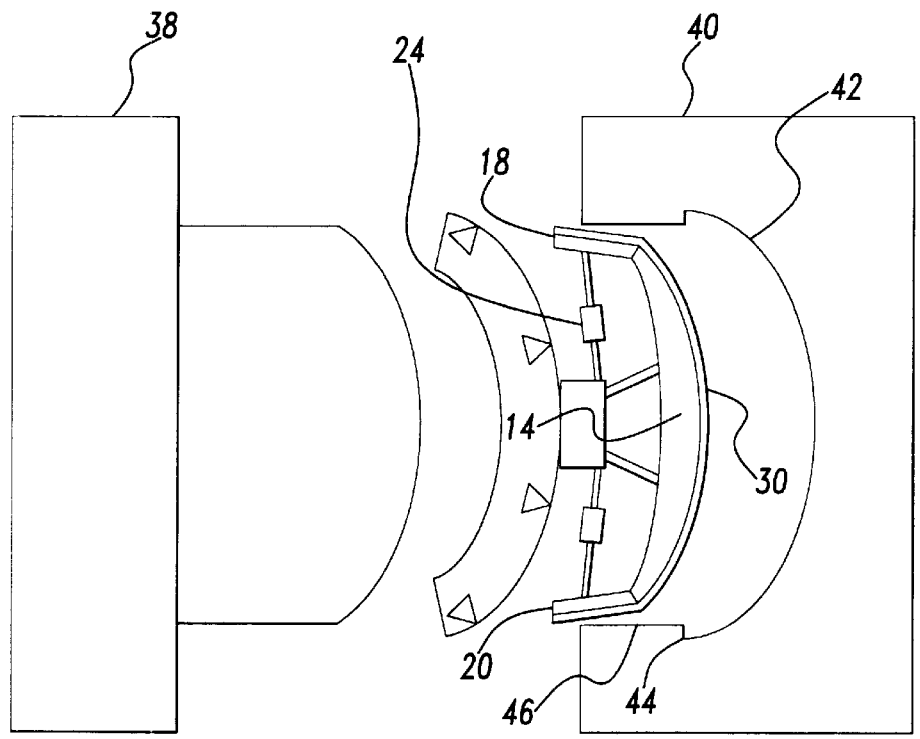
FIG. 4 is a cross-sectional view of the loader in the retracted position.
Figure 5:
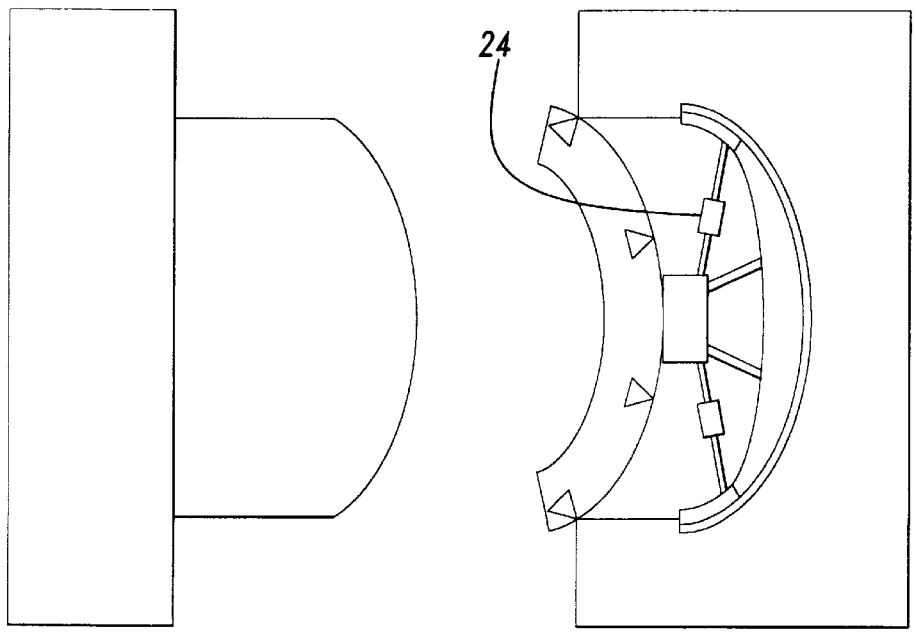
FIG. 5 is a cross-sectional view of the loader in an extended position.

The loader 14 receives a thin flexible film 30 from an unloading station 32 as illustrated in FIG. 3. The end portions 20 are in a retracted position and the loader 14 is moved within the loading station 32. The extenders 24 are extended and the end portions 18, 20 are moved to the extended position. The loader 14 has a surface that mates with the film 30. Vacuum is applied to vacuum ports 26 and the loader 14 receives the film 30 from the loading station 32. The construction and operation of the loading station 32 is described in co-pending co-assigned U.S. patent application Ser. No. 08/903,528 titled: METHOD AND APPARATUS FOR LOADING A PRE-MOLDED FILM INTO A MOLD, which is incorporated herein by reference. The loading station 32 transfers the film 30 on the loader 14. The vacuum ports 26 retain the film 30 onto the loader 14. Positioned opposite the loader 14 is a pivoting unloader 34. The pivoting unloader 34 operates to remove the molded article from a mold press 36 as will be described in more detail as shown in FIG. 4.

The loader 14 is moved between an open mold press 36. The mold press 36 has a moveable core 38 and a stationary cavity 40. The cavity 40 has an interior surface 42 that mates with the film 30. The method and apparatus of the mold press is described in co-pending, co-assigned U.S. patent application Ser. No. 08/903,364 titled: METHOD AND APPARATUS FOR MOLDING A FILM-COVERED ARTICLE, which is incorporated herein by reference.

The cavity surface 42 has an undercut portion 44 that forms a flange on a molded article. The undercut portion 44 creates an opening 46 that is narrower than the width of the loader 14 when the end portions 18, 20 are in an extended position. To insert the loader 14 into the cavity 40, the end portions 18, 20 must be moved to a retracted position. The extenders 24 are retracted therefore moving the end portions 18, 20 to the retracted position. This reduces the width of the loader 14 less than the opening 46. The loader 14 is moved within the cavity 40 without touching or damaging the film 30. Once the loader 14 is completely inserted within the cavity 40, the end portions 18, 20 are moved to an extended position by extenders 24. The film 30 is brought into uniform contact with the cavity surface 42. Vacuum is withdrawn from vacuum ports 26 and a short positive air pressure is applied to cause the film 30 to transfer onto the cavity surface 42. The end portions 18, 20 are again moved to a retracted position by the extenders 24. The loader 14 is removed from within the cavity 40. The mold press 36 is closed and a molded article is formed between the core 38 and cavity 40.

Figure 6:
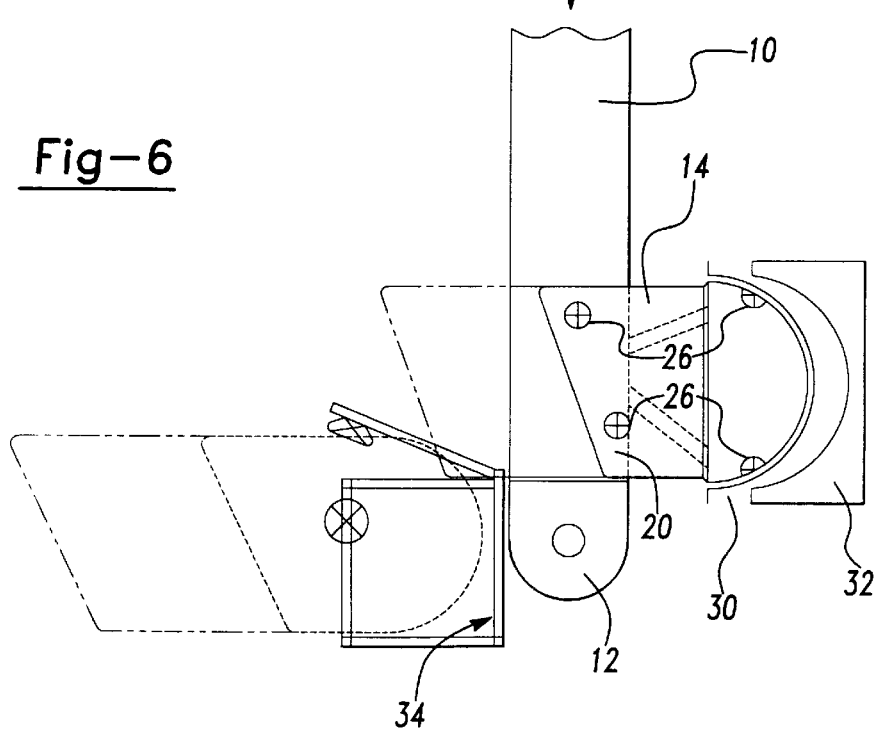
FIG. 6 is an alternative embodiment of the loader illustrated in FIG. 3.

The invention as illustrated in FIGS. 1–5 generally positions the unloader 34 opposite and parallel with the loader 14. This orientation is useful when the space between the core 38 and the cavity 40 is sufficiently large to enable a parallel placement of the loader and unloader. When the opening between the core 38 and the cavity 40 is narrow, the over all width of the loader and unloader may be reduced by positioning the loader above the unloader in a stacked arrangement. This space saving alternative embodiment is illustrated in FIG. 6. The loader 14 is positioned above the unloader 34. The total width of the loader 14 and unloader 34 is greatly reduced over the embodiment illustrated in FIG. 3.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A method of transferring a pre-molded film into a mold having a cavity comprising the steps of:

provideing a robotically controlled movable arm, said arm having an end, and a loader attached to said end, said loader having two movable end portions and a main portion there between, said end portions being movable between retracted and extended positions;

transferring said pre-molded film to said loader said film being retained on said end portions and said main portion;

moving said end portions from an extended to a retracted position, said loader being in an extended position when said ends are extended and a retracted position when said ends are retracted, said loader retracted position having a narrower width than said loader extended position, and said loader retracted position reducing the width of said film and said loader;

moving said arm to position said loader and said film within said cavity, said cavity having an opening larger than the width of said film and said loader while said loader is in said loader retracted position;

extending said end portions while said loader is within said cavity and placing said loader in said loader extended position, said cavity opening being narrower than the width of said film and said loader while said loader is in said loader extended position;

transferring said pre-molded film to a cavity surface of said cavity after said extending step;

retracting said end portions after said transferring step and moving said loader to said loader retracted position, said film being retained on said cavity surface; and moving said arm away from said cavity after said film has been transferred to said cavity surface.

2. The method of claim 1, further comprising applying a vacuum to retain said film on said end portions and said main portion.

3. The method of claim 2, during said transferring step and before said retracting step, further comprising removing said vacuum so that said film is no longer retained on said end portions and said main portion.

4. The method of claim 3, after said vacuum removing step and before said retracting step, further comprising applying a positive air pressure to release said film from said end portions and main portion.

\* \* \* \* \*